Sept. 25, 1951   A. J. W. M. VAN OVERBEEK   2,569,358
APPARATUS FOR PHASE MODULATING HIGH-FREQUENCY OSCILLATIONS
Filed March 10, 1948

ADRIANUS JOHANNES WILHELMUS MARIE van OVERBEEK
INVENTOR.

BY

ATTORNEY.

Patented Sept. 25, 1951

2,569,358

UNITED STATES PATENT OFFICE 2,569,358

APPARATUS FOR PHASE MODULATING HIGH-FREQUENCY OSCILLATIONS

Adrianus Johannes Wilhelmus Marie van Overbeek, Eindhoven, Netherlands, assignor to Hartford National Bank and Trust Company, Hartford, Conn., as trustee Application March 10, 1948, Serial No. 14,114
In the Netherlands April 29, 1947

7 Claims. (Cl. 332—25)

It is known to produce phase-modulated oscillations with the use of a circuit-arrangement comprising a cathode-ray tube the screen of which has produced on it with the use of a deflecting system controlled by a high-frequency voltage source a line-shaped luminous image which is deflected in a lateral direction of a deflecting system arranged at right angles to the first system, in accordance with a modulating low-frequency oscillation having an instantaneous value $\varphi$, the light beam of the said luminous image passing through two screens, of which the transparency to light as a function of a lateral displacement of the said luminous image, exhibits a sinusoidal and a cosinusoidal variation respectively and then striking two photo-electric cells, in which a current $\sin \varphi$ and $\cos \varphi$ respectively are thus produced, these currents then modulating two oscillations $\cos \omega t$ and $\sin \omega t$ respectively obtained, with the use of two phase-shifting networks, from a source of oscillations having a frequency $\omega$, whereupon the addition of these modulated oscillations $\cos \omega t \sin \varphi$ and $\sin \omega t \cos \varphi$ respectively yields a phase-modulated oscillation $\sin (\omega t + \varphi)$.

The invention has for its object to provide a similar circuit-arrangement, which, however, is substantially more simple since it does not use any photo-electric cells or separate modulator stages.

According to the invention, a circuit-arrangement in which the phase-modulated oscillations are formed by addition of at least two high-frequency oscillations of identical frequency and constant phase-difference which are amplitude-modulated in accordance with the instantaneous value of the modulating oscillation, the modulated oscillations being produced with the use of an electric discharge tube with directional electron beam, to a deflecting system of which the modulating oscillation is fed, the electrodes of the discharge tube are of such a shape and so arranged that at least two of the said amplitude-modulated high-frequency oscillations are produced at the anode of the discharge tube.

In order that the invention may be more clearly understood and readily carried into effect, it will now be described more fully with reference to the accompanying drawing, in which one embodiment is shown by way of example.

Figure 1:
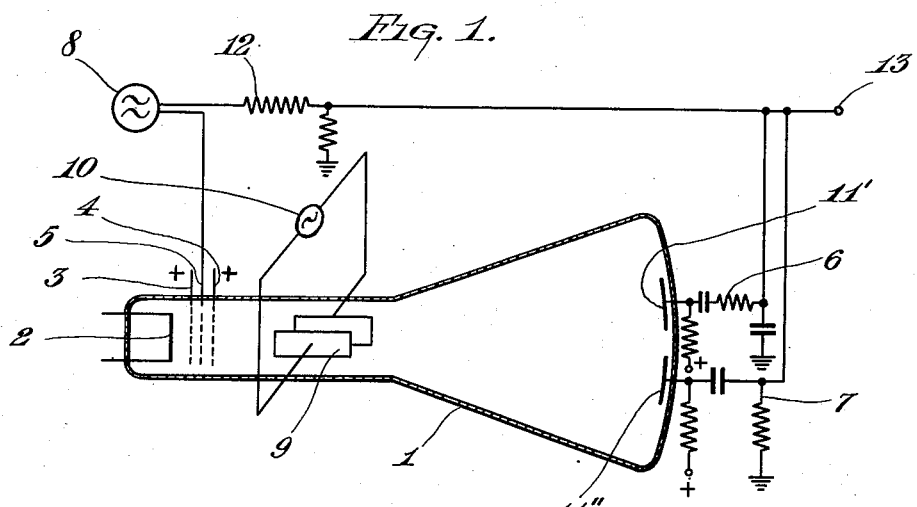
Fig. 1 is a schematic diagram of a phase modulation system in accordance with the invention.

Referring to Fig. 1 of the drawing, 1 designates an electric discharge tube having a cathode 2 and accelerating electrodes 3 and 4, which operate to produce a directional, flat electron beam. The electrode 5 arranged between the electrodes 3 and 4 has supplied to it a high-frequency oscillation of frequency $\omega$, which is obtained from a high-frequency voltage source 8 which, for the sake of simplicity, is shown as a voltage source external to the tube 1. As an alternative, these oscillations may be produced by regenerative feedback between the grids 3 and 5 and in this case the supply voltage will, as a rule, be supplied to the grid 5. The frequency $\omega$ is preferably highly constant; for this purpose the source 8 may be constituted in known manner by a crystal oscillator.

These high-frequency oscillations result in density modulation of the beam, so that the instantaneous current density of the beam varies with the frequency $\omega$.

Figure 2:
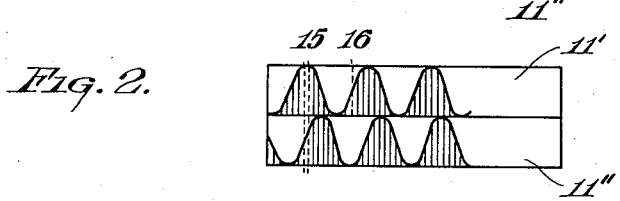
Fig. 2 is one preferred embodiment of an anode structure for the tube shown in Fig. 1.

The flat electron beam then passes through the deflecting system 9 to which are fed the modulating oscillations of instantaneous value $\varphi$ from a low-frequency voltage source 10 and is then focussed in line-shape on to the two anodes 11' and 11" of the discharge tube 1, which, as shown in Fig. 2 cross-hatched, comprise sinusoidal cuts.

The amplitude of the electron beam modulated in density for high-frequency currents by the frequency $\omega$ will thus vary in accordance with $1+\sin \varphi$ or $1+\cos \varphi$ respectively.

The two anodes 11' and 11" are connected through phase-shifting networks 6 and 7 to a terminal 13 which in addition is connected to the voltage source 8 through a reaction-avoiding resistance 12.

Figure 3:
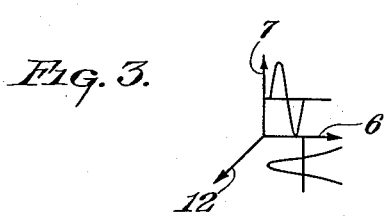
Fig. 3 is a vector diagram illustrative of the voltages appearing in the output circuit of the system in Fig. 1.

The voltage across the terminal 13 thus consists of three components, viz. one unmodulated voltage fed through resistance 12 and two modulated voltages fed through the networks 6 and 7. In the vector diagram of Fig. 3 these components are denoted by the vectors 12, 6 and 7, the sinoids shown adjacent the vectors 6 and 7 indicating the lengths of these vectors for different values of the modulating voltage $\varphi$.

In formula we find for these vectors:

$$-\cos \omega t - \sin \omega t;\ \sin \omega t\ (1-\cos \varphi)$$

and $$\cos \omega t\ (1+\sin \varphi)$$

respectively. The overall voltage produced across the terminal 13 thus exhibits a value $$-\cos \omega t - \sin \omega t + \sin \omega t\ (1+\cos \varphi)$$
$$+\cos \omega t\ (1+\sin \varphi) = \sin (\omega t + \varphi)$$

Hereinafter a number of variances of the embodiment of the invention as described will be discussed.

a. The two modulated and phase-shifted high-frequency oscillations from the phase-shift networks 6 and 7 may be produced, for example, by using, for example, two grids 5, one grid modulating in density, for high-frequency currents, the electron beam fed to the anode 11′, in accordance with a function sin ωt and the other grid modulating in density the electron beam fed to the anode 11″, in accordance with a function cos ωt. In this case the two anodes 11′ and 11″ need not be electrically separated. As an alternative use may be made in this case, for example, of a single anode 11′ provided with cuts, two density-modulated beams being focussed, side by side, on to this electrode at a relative spacing which corresponds to the required low-frequency phase-shift (designated in Fig. 2 by dotted lines 15 and 16).

As an alternative, the density modulation may be effected, for example by feeding two phase-shifted oscillations from the high-frequency voltage source 8 to the two anodes 11′ and 11″. In this case, however, the amplitude of these high-frequency oscillations must have a comparatively high value in order to act appreciably on the flow of electrons towards the electrodes 11′ and 11″, whereas in the former case also the definition of the image of the electron beam on these electrodes 11′ and 11″ is affected, which may be avoided by arranging an electrode of the kind shown in Fig. 2, which is provided with cuts as a shadow electrode in front of two separate anodes 11′ and 11″, which, as a matter of course, need not be shaped in this case into a particular form.

Figure 3A:
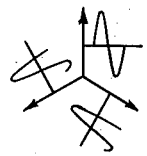
Fig. 3a is another vector diagram of the voltages appearing in the output circuit of the system shown in Fig. 1.

Instead of abstracting high-frequency oscillations of frequency ω from the anodes 11′ and 11″, use may alternatively be made of a higher frequency or of a subharmonic of this frequency.

b. The phase-modulated oscillation may be built up from three or more modulated high-frequency oscillations which may or may not be symmetrically phase-shifted. One example thereof is shown in the vector diagram of Fig. 3a, it being built up from the three oscillations cos ωt, cos (ωt+120) and cos (ωt+240), the amplitudes of which vary with the instantaneous value φ of the low-frequency source 10, in accordance with the functions (1+sin φ), 1+sin (φ−120) and 1+sin (φ−240) respectively and use being made of three anodes which exhibit cuts in accordance with sin φ, sin (φ−120) and sin (φ−240), it being possible to arrange a third anode which is not provided with cuts, for example, behind the two other anodes in such manner that the shadow of these electrodes on the third one exactly corresponds to the required cuts. Instead of modulating the electron beam in density with the use of the electrode 5, a high-frequency voltage of small amplitude may alternatively be caused to operate, for example, in series with the voltage source 10, owing to which the electron beam impinging on the anode 11 is subjected to high-frequency lateral displacements such that high-frequency oscillations are produced, the amplitude of which corresponds to the derivative of the anode cuts shown in Fig. 2. In this case the oscillation fed through the resistance 12 may be omitted, so that the phase-modulated oscillation is formed by the addition of only two amplitude-modulated oscillations.

2. The flat electron beam may be produced, for example, with the use of an auxiliary deflecting system arranged at right angles to the system 9, to which a high-frequency oscillation is fed, with similar effect as described with reference to the known circuit-arrangement mentioned in the opening part of this specification.

If the deflecting system 9, which may be formed in the shape of deflecting plates or deflection coils, produces a non-linear deflection of the electron beam, the shape of the electrodes 11′ and 11″ may be altered to accord therewith.

Figure 2A:
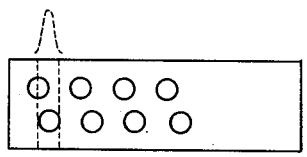
Fig. 2a is another preferred embodiment of an anode structure for the tube shown in Fig. 1.

The electron beam may be reproduced with low definition on an anode having periodic cuts or recesses, the period of the recess being approximately equal to double the width of the electron beam. Fig. 2a shows an example of such an anode which is provided with circular recesses, the diameter of which is equal to the spacing between two small successive circles and equal to the width of the electron beam shown in dotted lines, the electron density distribution of which is indicated above the figure.

It is possible in this case to arrange for the amplitude of the high-frequency oscillation to exhibit an approximately sinusoidal form as a function of the instantaneous value φ of the modulating oscillation fed to the deflecting system 9.

Obviously the electrode shown in Fig. 2a may alternatively be arranged as a shadow electrode in front of one or two anodes, the modulated high-frequency oscillations being thus collected by said anodes.

What I claim is:

1. A circuit arrangement for producing phase-modulated high-frequency oscillations comprising a cathode ray tube including means to generate an electron beam having a flat configuration, a beam density control electrode, an anode structure disposed to intercept said beam and constituted by two parallel sections perpendicularly arranged with respect to the axis of said beam, said beam forming an electron line transversely on said anode structure, and means to deflect said electron line longitudinally along said anode structure, means to apply high-frequency oscillations to said control electrode to vary the density of said beam in accordance therewith, means to apply a modulating wave to said deflection means to deflect said beam along said anode structure in accordance therewith, first and second output circuits connected respectively to the sections of said anode structure, said sections being formed of alternate conductive and non-conductive portions to provide high-frequency oscillations in said output circuits of identical frequency and constant phase difference which are amplitude modulated in accordance with the instantaneous value of said modulating wave, and means to combine the oscillations produced in said output circuits to produce phase-modulated high-frequency oscillations.

2. A circuit arrangement for producing phase-modulated high-frequency oscillations comprising a cathode ray tube including means to generate an electron beam having a flat configuration, a beam density control electrode, an anode structure disposed to intercept said beam, and constituted by two parallel sections arranged perpendicularly with respect to the axis of said beam, said flat beam forming an electron line transversely on said anode structure, and means to deflect said transverse electron line in the longitudinal direction on said anode structure, a source of high-frequency oscillations coupled to said control electrode to density modulate said beam in accordance therewith, means to apply a modulating wave to said deflection means to deflect said beam along said anode structure in accordance therewith, first and second output circuits connected respectively to the sections of said anode structure, said sections being shaped to produce in said output circuits high-frequency oscillations of identical frequency and constant phase difference which are amplitude modulated in accordance with the instantaneous value of the modulating wave, and means to combine the voltages yielded by said output circuits and said source to produce phase-modulated oscillations.

3. A circuit arrangement for producing phase-modulated high-frequency oscillations comprising a cathode ray tube including means to generate an electron beam having a flat configuration, a beam density control electrode, an anode structure arranged to intercept said beam and constituted by two parallel sections disposed perpendicularly with respect to the axis of said beam, said flat beam forming an electron line transversely on said anode structure, and means to deflect said transverse electron line in the longitudinal direction on said anode structure, a source of high-frequency oscillations coupled to said control electrode to density modulate said beam in accordance therewith, means to apply a modulating wave to said deflection means to deflect said beam along said anode structure in accordance therewith, first and second output circuits each including a phase-shifting network connected respectively to the sections of said anode structure, said sections being shaped to produce in said output circuits two high-frequency oscillations of identical frequency and constant phase difference which are amplitude modulated in accordance with the instantaneous value of the modulating wave, and means to combine the voltages yielded by said output circuits and said source to produce phase-modulated oscillations.

4. A circuit arrangement for producing phase-modulated high-frequency oscillations comprising a cathode ray tube including means to generate an electron beam having a flat configuration, a beam density control electrode, an anode structure arranged to intercept said beam and constituted by two parallel sections disposed perpendicularly with respect to the axis of said beam, said flat beam forming an electron line on said anode structure, and deflection electrodes to deflect said transverse electron line in the longitudinal direction on said anode structure, means to apply high-frequency oscillations to said control electrode to density modulate said beam, means to apply a modulating wave to said deflection electrodes to deflect said beam along said anode structure in accordance therewith, first and second output circuits connected respectively to the sections of said anode structure, said sections being sinusoidally shaped to produce in said output circuits two high-frequency oscillations of identical frequency and constant phase difference which are amplitude modulated in accordance with the instantaneous value of the modulating wave, and means to combine the voltages yielded by said output circuits to produce phase-modulated oscillations.

5. A circuit arrangement for producing phase-modulated high-frequency oscillations comprising a cathode ray tube including means to generate an electron beam having a flat configuration, a beam density control electrode, an anode structure constituted by two parallel sections disposed perpendicularly with respect to the axis of said beam, said flat beam forming an electron line transversely on said anode structure, and deflection electrodes to deflect said electron line in the longitudinal direction on said anode structure, a source of high-frequency oscillations coupled to said control electrode to density modulate said beam, means to apply a modulating wave to said deflection electrodes to deflect said beam along said anode structure in accordance therewith, first and second output circuits each including a phase-shifting network connected respectively to the sections of said anode structure, said sections being sinusoidally shaped and having a 90 degree phase displacement to produce in said output circuits two high-frequency oscillations of identical frequency and constant phase difference which are amplitude modulated in accordance with the instantaneous value of the modulating wave, and means to combine the voltages yielded by said output circuits and said source to produce phase modulated oscillations.

6. A circuit arrangement for producing phase-modulated high-frequency oscillations comprising a cathode ray tube including means to generate an electron beam having a flat configuration, a beam density control electrode, an anode structure constituted by two parallel sections disposed perpendicularly with respect to the axis of said beam, said flat beam forming an electron line of predetermined width transversely on said anode structure, and deflecting electrodes to deflect said electron line in the longitudinal direction on said anode structure, a source of high-frequency oscillations coupled to said control electrode to density modulate said beam, means to apply a modulating wave to said deflecting electrodes to deflect said beam along said anode structure in accordance therewith, first and second output circuits connected respectively to the sections of said anode structure, each section being provided with periodic cuts the period of which is substantially equal to twice said predetermined width of said line to produce in said output circuits two high frequency oscillations of identical freqency and constant phase difference which are amplitude modulated in accordance with the instantaneous value of the modulating wave, and means to combine the voltages yielded by said output circuits and said source to produce phase-modulated oscillations.

7. A circuit arrangement for producing phase-modulated high-frequency oscillations comprising a cathode-ray tube including means to generate an electron beam, an anode structure constituted by two output electrodes positioned to intercept said beam, said beam forming an electron line transversely on said output electrodes and means to deflect said electron line longitudinally along said output electrodes, means to apply high-frequency oscillations to said tube to vary the beam current flowing to said output electrodes in accordance therewith, means to apply a modulating wave to said deflection means to displace said beam along said output electrodes in accordance therewith thereby to vary the amplitude of the high-frequency current supplied to said output electrodes in a prescribed relationship to said modulating wave, a phase-shifting network connected to said output electrodes to produce high-frequency oscillations in the output thereof of identical frequency and constant phase difference which are amplitude-modulated in accordance with the instantaneous value of the modulating wave, and means to combine the oscillations yielded in the output of said network to produce phase-modulated high-frequency oscillations.

ADRIANUS JOHANNES WILHELMUS
    MARIE van OVERBEEK.

REFERENCES CITED

The following references are of record in the file of this patent:

UNITED STATES PATENTS

| Number | Name | Date |
|---|---|---|
| 2,148,166 | Kucher | Feb. 21, 1939 |
| 2,241,027 | Bumstead | May 6, 1941 |
| 2,294,209 | Roder | Aug. 25, 1942 |
| 2,337,272 | Roberts | Dec. 21, 1943 |